R. H. TAYLOR.
Hominy Machine.
No. 57,406. Patented Aug. 21, 1866.
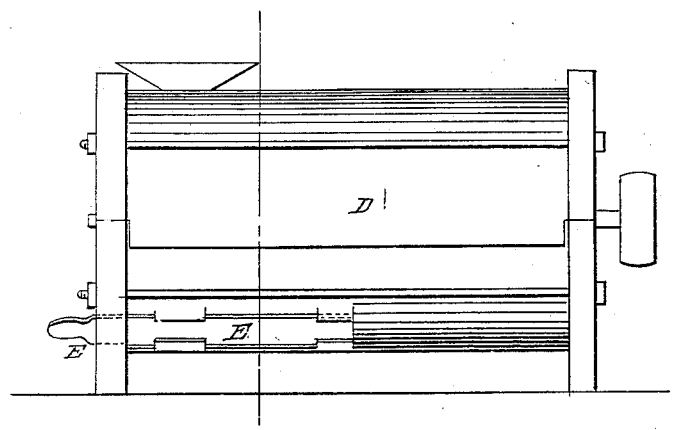
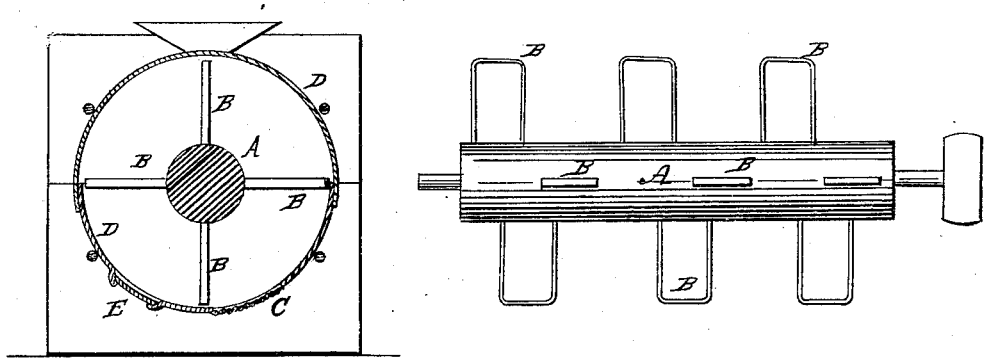

UNITED STATES PATENT OFFICE.

RICHARD HENRY TAYLOR, OF GOOSE CREEK, VIRGINIA.

IMPROVEMENT IN HOMINY-MACHINES.

Specification forming part of Letters Patent No. 57,406, dated August 21, 1866.

*To all whom it may concern:*

Be it known that I, RICHARD HENRY TAYLOR, of Goose Creek, county of Loudoun, and State of Virginia, have invented a new and useful Improvement in Hominy-Beaters; and I hereby declare that the following is a full and exact description thereof, reference being had to the accompanying drawings, and to the letters of reference marked thereon.

My improvement relates to that class of hominy-beaters in which a horizontal shaft is revolved in a cylindrical box or shell. By long experience in beating hominy I find great difficulty in keeping the inner surface of the shell clean from adhering meal and hulls, which form a soft cushion-like surface and greatly retard the process of beating or hulling.

My invention consists in so arranging the beaters upon the rotating shaft as to sweep the entire surface, or nearly the entire surface, of the inside of the shell.

In the accompanying drawings, Figure 1 is a side elevation of my improved hominy-beater. Fig. 2 is a vertical transverse section of the same. Fig. 3 is a detached view of the beaters.

In the construction of my new beater the box or shell or hollow cylinder may be made in any suitable manner, as shown at D, Figs. 1 and 2. A hopper, E, is employed to introduce the corn to the machine.

At the bottom of the shell is placed a wire screen, C, through which the meal escapes. A sliding door, E, is also placed near the bottom of the shell for the purpose of discharging the hominy. Within this shell is placed a shaft, A, provided with beaters B, which extend nearly to the shell D, as seen in Fig. 2. These beaters are of the form of staples, and present a considerable extent of surface to sweep the meal from the inside of the shell. They are so placed in succession along the length of the shaft A as to work the whole contents of the beaters and to sweep the whole inner surface of the shell D. Motion is given to the shaft A and beaters B by means of a band upon the pulley F.

The above-described beaters not only prevent meal from adhering and accumulating upon the inner surface of the shell D, but the head of the beater or broad loop of the staple gives an extensive surface for beating the hominy. Therefore my machine is not only efficient, but it works very rapidly.

Instead of staples, the T-shaped beater may be used; but I prefer the staples; or the staples may be set obliquely and the loop more rounded, or they may be placed in a spiral series. In case they are set obliquely it will be better to reverse part of the staples, in order to prevent them from pushing the hominy to one end of the shell.

I am aware that spikes or headed beaters have been used to sweep about one-half of the inner surface of the shell, in connection with counter-beaters in close-set rows; but the beaters and counter-beaters perform more of a grinding or breaking action, and I do not claim such action.

Having thus fully described my invention, what I claim, and desire to secure by Letters Patent of the United States, is—

1. So arranging the beaters upon a rotating shaft as to sweep the entire surface, or nearly the entire surface, of the shell or hollow cylinder, substantially in the manner and for the purposes set forth.

2. The combination of the beaters B and screen C, for discharging the meal from the machine, substantially as described.

RICHARD HENRY TAYLOR.

Witnesses:
THOMAS C. CONNOLLY,
THEODOR POESCHE.